United States Patent [19]

Plymale

[11] Patent Number: 4,968,779
[45] Date of Patent: Nov. 6, 1990

[54] ADHERENT COATING FROM ETHYLENE DIAMINE TETRA ACETIC ACID AND METHACRYL COMONOMER

[76] Inventor: Richard W. Plymale, 1480 Griffin Rd., Davison, Mich. 48423

[21] Appl. No.: 210,366

[22] Filed: Jun. 23, 1988

[51] Int. Cl.$^5$ .............................................. C08G 69/10
[52] U.S. Cl. .................................... 528/328; 526/304; 528/310
[58] Field of Search ................. 528/328, 310; 526/304

[56] References Cited

U.S. PATENT DOCUMENTS 3,843,567  10/1974  Matsunaga et al. ................ 528/328

OTHER PUBLICATIONS

Dictionary of Organic Compounds, 1965, p. 1378.

*Primary Examiner*—Harold D. Anderson
*Attorney, Agent, or Firm*—Kenneth I. Kohn

[57] ABSTRACT

An adherent coating for calcium and magnesium containing minerals consists essentially of an integral block of the following structure:

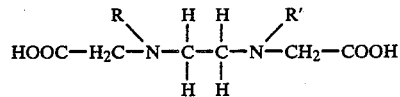

wherein R and R' are selected from the group including ethylene oxide, propylene oxide, vinyl, acrylic, methacrylate, styrene and combinations thereof. The present invention also provides a method of making the adherent coating and substrates with which it is effective.

1 Claim, No Drawings

ADHERENT COATING FROM ETHYLENE DIAMINE TETRA ACETIC ACID AND METHACRYL COMONOMER

TECHNICAL FIELD

The present invention relates to an adherent coating and method of making the same for improving the adhesion of composite materials and resins to a substrate. More specifically, the present invention provides a coating and method of making the same for improving adhesion of composite materials and resins to calcium containing minerals such as calcium carbonates, calcium phosphates and other substrates.

BACKGROUND ART

In compounding resins for such coating applications, resins containing carboxyl groups are added to enhance pigment wetting, gloss, and adhesion to substrates. In such polyblends of resins, a monomer is polymerized to the ends of polymer chains, the final resulting copolymer being a chain with sequences of different segments which are called block polymers.

There exists commercially available block polymers derived from the addition of various portions of monomers, such as ethylene oxide and propolyene oxide, to ethylenediamine.

In utilizing block copolymers as an adherent coating, three elements are normally analyzed in the formation of an adhesive bond. The three elements are the ability to wet the substrate, the spreading of the liquid over the surface of the substrate, and the capability of the liquid to harden into a solid material close in physical characteristics, such as Young's modulus to the substrate.

A wetting agent is any substance that increases the ability of liquid to displace air or other gas or water or another liquid from a solid surface. Such wetting agents influence three kinds of wetting; that is, spreading, adhesion and immersion. With regard to the present invention, it is preferable to have a wetting agent capable of excellent spreading characteristics as well as adhesion characteristics.

Spreading wetting is measured by the spreading coefficient. Spreading wetting occurs spontaneously only if the spreading coefficient is positive. For any liquid spreading over any surface, the spreading coefficient is calculated from the surface and interfacial tensions of liquids and surfaces involved.

Adhesion wetting is defined by how tightly a liquid adheres to a surface with which it was not previously in contact. Adhesional wetting is measured by the work required to separate a liquid from the wetted surface. If a liquid is wetting another liquid, surface and interfacial tensions are used to calculate the wetting constants, and if a solid surface is being wet, the contact angle is used for the calculation.

With regard to the ability of a liquid to harden into a solid material close to the substrate, chacteristics such as elastic modulus and coefficient of thermal expansion are critical.

In view of the above mentioned desired characteristics, the present invention provides an improved adhesive coating for providing a tightly adherent coating for human teeth, for use as a primer in advance of fillings, decorative coatings, and as a sealer to prevent subsequent decay.

Compounds have been developed for providing an adhesive bonding of composite materials to hard tooth tissues. For example, the U.S. Pat. No. 4,521,550 to Bowen, issued June 4, 1985 and 4,588,756 to Bowen, issued May 13, 1986 relate to methods for obtaining strong adhesive bonding of composites to dentin, enamel, and other substrates. The Bowen patents provide a substrate surface that is treated with an aqueous solution of at least one acidic salt containing a polyvalent cation which preferably is capable of changing valence by unit steps and which can bind to dentin or enamel surface sites, and at least one anion which preferably forms a relative water-insoluble precipitate or precipitates with calcium, and which contains at least one carboxyl group and preferably two or more carboxyl groups. After treatement of the surface with a solvent, a final solution is applied.

SUMMARY OF THE INVENTION

In accordance with the present invention, there is provided an adherent coating for calcium containing substrates consisting essentially of an integral block of the following structure

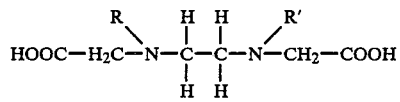

wherein R and R' are selected from the group including ethylene oxide, propylene oxide, vinyl, acrylate, methacrylate and styrene. The present invention further provides a method of making the coating including the steps of reacting ethylene diamine diacetic acid with a resinous monomer selected from the group including ethylene oxide, propylene oxide, propylene, vinyl, acrylate, mathacrylate and styrene and combinations thereof to form an ethylene diamine diacetic acid copolymerized with the resinous monomer and recovering the copolymer from the reactants.

DESCRIPTION OF PREFERRED EMBODIMENTS

In accordance with the present invention, an adherent coating particularly useful for human teeth consists essentially of an integral block of the following structure:

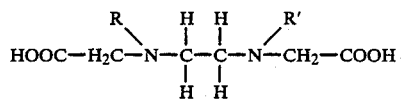

wherein R and R' are selected from the group including ethylene oxide, propylene oxide, propylene, vinyl, acrylate, methacrylate and styrene. Preferably, R and R' are methacrylate. The resulting ethylenically unsaturated monomer has the following structure:

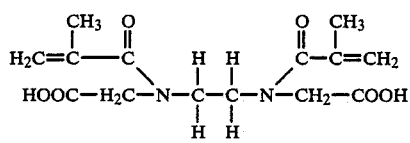

This particular compound provides a tightly adherent coating for human teeth, for use as a primer in advance of fillings, decorative coatings and a sealer to prevent decay. The compound including two carboxylic groups attached to ethylene diamine creates a hexidentate ligand providing a block copolymer with carboxylic groups on the main ethylene backbone. This hexidentate ligand provides the adhesive characteristics of the present invention. The hexidentate ligand is a chelate which is chemisorbed assisting in providing a tightly bound coating by virtue of its chemisorption/chelation with the calcium ions of the tooth.

The preferred compound of the present invention is capable of being chemisorbed on minerals to improve adhesion, such materials as fillers, pigments, and reinforcements. Specifically, the copolymer can be bonded to hydroxyapatite as a specific filler or substrate. The compound can also be a chemisorbed bonding agent for hydroxyapatite materials, such as bone, tooth enamel, and dentin. The compound provides a long lasting seal or barrier to microbial invasion.

The present invention further provides a method of making the adherent coating, generally including the steps of reacting ethylene diamine diacetic acid with a resinous monomer selected from the group including ethylene oxide, propylene oxide, vinyl, acrylate, methacrylate, styrene, and the combination thereof to form ethylene diamine diacetic acid copolymerized with the resinous monomer and then recovering the copolymer from the reactants. More specifically, it is desirable to mix ethylene diamine diacetic acid, pyridine methylene chloride, and methyacrylic anhydride in a closed vessel. The mixture is heated and neutralized. The container then contains a two phase solution, a top water phase and a bottom pyridine phase. The top phase is removed from the vessel and acidified to form a solid product therein. The solid product is then filtered from the upper layer.

The following experiments were performed providing examples of the invention.

EXAMPLE 1

Ethylene diamine was reacted with glycidyl methacrylate to yield ethylene diaminedimethacrylate. The ethylene diaminedimethacrylate was reacted with chloroacetic acid, but yielded no product.

EXAMPLE 2

Ethylene diamine diacetic acid was reacted with methacryloyl chloride, to yield ethylene diamethacrylatoamide N,N'-diacetic acid.

The resultant product, ethylene diaminedimethyacrylate was found to be particularly efficatious in wetting mineral substrates with which chemisorbtion takes place. A specific example of such a substrate is hydroxyapatite, which is a mineral having considerable biological significance. To illustrate the ability of the product to sequester or chelate calcium of the hydroxy apatite, the ability of the product to react with calcium carbonate is measured in a standard test. The present invention actually reacted with 169 milligrams per gram, compared with a literature value of 339 milligrams per gram for ethylene diamine tetraacetic acid.

EXAMPLE 3

25 grams ethylene diamine diacetic acid was added to water. A 50% sodium hydroxide solution was added until dissolution was complete. Ten parts per million of hydroquinone was added. The solution was chilled to 0° C. Fifteen grams of freshly distilled methacryloyl chloride was added to the mixture and stirred for one hour at 0° C. The solution was acidified to pH 6.5 with hydrochloric acid. The mixture was concentrated in vacuo. The resulting solid was extracted with methanol and filter. The exact was evaporated to dryness. A diacid dimer was isolated with a melting range of 150° to 180° C. providing a yield of approximately 80%. Some crosslinkage was noted but increasing crosslinking inhibitor did not seem to improve the yield of crosslinked product.

EXAMPLE 4

The following were charged to a closed vessel:
134 grams pyridine
284 grams methylene chloride
25 grams of ethylene diamine diacetic acid
49 grams of methyacrylic anhydride.
The mixture was heated at 60° for 24 hours and neutralized to pH 7 with sodium hydroxide. The container contained a two phase solution having a top water phase and a bottom pyridine phase. The top layer included the salt of the diacid and sodium methacrylate. The bottom layer included the methylene chloride and pyridine. The upper layer was decanted and hydrogenchloride was added acidify the top layer to a pH between 4 to 5. Solids were filtered from the top layer, washed with water and the product was dried. The reaction produced a 90% yield of the methylene diamine diacetic dimethacrylate. This method has thus far been found to be the preferred method of making the desired product.

What is claimed is:

1. An adherent coating consisting essentially of an integral block of the following structure

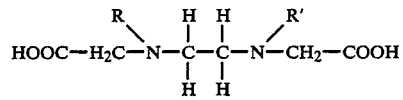

wherein R and R' are selected from the group consisting of methyacryloyl chloride, methyacrylic anhydride and methacrylic anhydride.